US006185001B1

(12) United States Patent
Webendorfer et al.

(10) Patent No.: US 6,185,001 B1
(45) Date of Patent: Feb. 6, 2001

(54) PRINTED DOCUMENT AND METHOD OF DETERMINING THE PRINT QUALITY OF A PRINTED DOCUMENT

(75) Inventors: Stephen D. Webendorfer, Miamisburg; William H. Mowry, Jr., Dayton; Joseph V. Riccardella, Centerville, all of OH (US)

(73) Assignee: The Standard Register Company, Dayton, OH (US)

( * ) Notice: Under 35 U.S.C. 154(b), the term of this patent shall be extended for 0 days.

(21) Appl. No.: 09/241,241

(22) Filed: Feb. 1, 1999

(51) Int. Cl.[7] .................................................. G06F 15/00
(52) U.S. Cl. .......................... 358/1.2; 358/1.1; 358/296; 358/298; 358/406; 358/504; 347/19; 382/112
(58) Field of Search ............................... 358/1.1, 1.2, 1.3, 358/1.11, 1.14, 1.15, 1.18, 296, 298, 504, 406; 347/19, 178, 179; 399/49, 58, 74; 355/40, 61; 382/112, 215, 216, 256, 306, 309

(56) References Cited

U.S. PATENT DOCUMENTS

| | | | |
|---|---|---|---|
| 4,527,333 | * 7/1985 | Warner | 33/1 B |
| 4,649,502 | 3/1987 | Keller et al. | 364/519 |
| 5,416,613 | 5/1995 | Rolleston et al. | 358/518 |
| 5,598,272 | 1/1997 | Fisch et al. | 358/298 |
| 5,642,202 | 6/1997 | Williams et al. | 358/296 |
| 5,767,980 | 6/1998 | Wang et al. | 358/298 |

* cited by examiner

Primary Examiner—Edward L. Coles
Assistant Examiner—Mark Wallerson
(74) Attorney, Agent, or Firm—Killworth, Gottman, Hagan & Schaeff, L.L.P.

(57) ABSTRACT

A printed document includes a print quality indicator on the print surface of the document in the primary printing area. The image of the print quality indicator has a plurality of printed targets, each of the targets defining an unprinted area. The dimensions of the unprinted areas of the targets varying among the targets. The print quality of the printed document is determined by noting which of the unprinted areas in the print quality indicator printed on the document are not clearly free of ink upon close visual inspection of the document. Each target is made up of a printed circle, having a specified outer diameter, a specified line weight, and a specified inner diameter, and a printed circular dot, having a specified diameter, positioned centrally within the printed circle. The specified diameter of the printed circular dot is less than the specified inner diameter of the printed circle such that the printed circular dot and the printed circle define an annular unprinted area there between.

28 Claims, 5 Drawing Sheets

PRINTED DOCUMENT AND METHOD OF DETERMINING THE PRINT QUALITY OF A PRINTED DOCUMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention is directed to a printed document including a print quality indicator and a method of determining the print quality of the printed document.

It is well known that images which are to be printed typically undergo distortion and degradation to a greater or lesser degree during the various steps of the printing process. For example, as an image goes from a photographic negative, where it may be very clear, to a plate, from the plate to a printing blanket, and finally from the blanket onto the document substrate in an offsetlithography printing operation, the quality of the image will necessarily decline to some degree at each stage of the process.

It is common in the printing industry to measure and control the quality of images printed on documents. It is also common to measure and control the quality of the images at each successive stage in the printing process. For example, if the quality of the image on the photographic negative or on the plate is too low, printed documents of less than acceptable quality will necessarily result and there is no need to go to the expense of printing documents using such a negative or plate in order to measure quality. In commercial printing operations, print quality targets of various graphical configurations, sometimes referred to as "control bars," are printed in trim areas of a sheet or web. One difficulty with such control bars is that they are not within the primary printing area of the sheet or web, so that the observed or measured quality of the printing of the control bars on the printed sheet or web may not accurately reflect the quality of the print image within the primary printing area. Another difficulty with such control bars is that since they are printed within trim areas, they are removed with the trim areas during finishing operations and therefore do not permit a quality assessment of the documents to be subsequent to finishing. Another difficulty with such control bars is that there use is limited to documents that include trims areas, and numerous business forms do not include trim areas. Another drawback of prior art printed quality targets of this type is that they are designed to measure primarily mechanical dot gain, i.e. the gain experienced in halftone dot size, of mid-size halftone dots. They do not provide an indication of the sharpness or print quality of the halftone dots.

Other types of self-contained quality control targets have been printed in the primary printing areas of documents—solid density boxes, built into borders of various designs, dot area targets, included within the pantograph screened area of documents, and extremely small alpha-numeric characters, termed microprint characters, also included within the pantograph screened area of documents. None of these arrangements, however, has provided a quantitative means for evaluating dot structure. Characteristics of dot structure include shape, size, and edge definition. Previously, the dots and microprint characters were magnified and visually inspected, and a subjective assessment was then made as to the quality of the printing. Because of the subjective nature of this process, it has not been possible to articulate an objective quality standard for such products.

It is seen therefore that there is a need for a printed document including a print quality indicator and for a method of determining the print quality of the printed document in which the print quality indicator may be printed within the primary printing area of the document and in which an objective, repeatable measure of print quality can be obtained.

SUMMARY OF THE INVENTION

These needs are met by a printed document and a method of determining the print quality of the printed document according to the present invention. The printed document includes a print quality indicator on the print surface of the document. The document has a document substrate defining a print surface upon which print images and a print quality indicator are printed in a primary printing area. The image of the print quality indicator comprises a plurality of printed targets, each of the targets defining an unprinted area. The dimensions of the unprinted areas of the targets vary among the targets. The print quality of the printed document is determined by noting which of the unprinted areas in the print quality indicator printed on the document are not clearly free of ink upon close visual inspection of the document.

The print images and the image of the print quality indicator originate on a photographic negative. The desired image of each target may comprise a printed circle, having a specified outer diameter, a specified line weight, and a specified inner diameter, and a printed circular dot, having a specified diameter, positioned centrally within the printed circle. The specified diameter of the printed circular dot is less than the specified inner diameter of the printed circle such that the printed circular dot and the printed circle define an unprinted area there between. The unprinted area is generally annular in shape. The specified outer diameter of each printed circle is preferably substantially 0.010 inch, and the specified inner diameter of each printed circle is preferably substantially 0.006 inch. The image of the print quality indicator may comprise nine targets, with the targets having printed circular dots of substantially the following diameters: 0.0038 inch, 0.0035 inch, 0.0032 inch, 0.0028 inch, 0.0025 inch, 0.0022 inch, 0.0019 inch 0.0016 inch, and 0.0013 inch. The identity of the target having the largest printed circular dot in which the unprinted area is free of ink on the printed document provides an objective indication of the sharpness or print quality of the print images printed on the print surface. The targets on the printed document are preferably observed for this purpose under magnification, preferably under substantially 30× magnification.

The targets on the printed document may be arranged in a single row and intermingled with the images printed on the print surface. Alternatively, the targets on the printed document may be arranged in rows and columns forming a generally rectangular array and intermingled with the images printed on the print surface. The print quality indicator preferably comprises nine targets which occupy an area approximately 0.010 inch by 0.090 inch. The nine targets are sufficiently small so as not to be readily apparent upon casual inspection of the print surface without the aid of magnification.

The method of determining the print quality of a printed document according to the present invention comprises the step of providing a print quality indicator image including a plurality of printed targets. Each of the targets defines an unprinted area, with the dimensions of the unprinted areas of the targets varying among the targets. The method further includes the step of providing a document substrate defining a print surface. The method further includes the step of printing print images on the print surface in the primary printing area, and printing the print quality indicator image on the print surface in the primary printing area. Finally, the method includes the step of visually inspecting the document and noting which of the unprinted areas in the print quality indicator printed on the document are not clearly free of ink. The print images and the print quality indicator image are initially provided on a photographic negative. The image of each of the targets making up the print quality indicator image includes a printed circle and printed inner dot. The identity of the target having the largest printed circular dot in which the unprinted area is free of ink on the printed document provides an objective indication of the sharpness or print quality of the print images printed on the print surface. The step of visually inspecting the document may include the step of observing the targets on the printed document under substantially 30× magnification to determine the identity of the target having the largest printed circular dot in which the unprinted area is free of ink.

The step of printing print images on the print surface, and printing the print quality indicator image on the print surface may comprise the step of printing print images and the print quality indicator image on the print surface substantially simultaneously. Alternatively, the step of printing print images on the print surface, and printing the print quality indicator image on the print surface may comprise the step of printing at least some of the print images and the print quality indicator image on the print surface substantially simultaneously, while printing the balance of the print images on the print surface either before or after printing the print quality indicator on the print surface. In the latter case, the print quality indicator will only provide an indication of quality of the simultaneously printed print images.

Accordingly, it is an object of the present invention to provide a printed document including a print quality indicator and a method of determining the print quality of the printed document which an objective indication of print quality is consistently achieved; to provide such a document and method in which the print quality indicator is inconspicuous when printed on the document in the primary printing area along with the document print images; and to provide such a document and method in which the print quality indicator provides a simple means of distinguishing between documents of acceptable quality and documents of unacceptable quality.

Other objects and advantages of the invention will be apparent from the following detailed description, the accompanying drawings, and the appended claims.

DETAILED DESCRIPTION OF THE PREFERRED EMBODIMENT

Figure 1A:
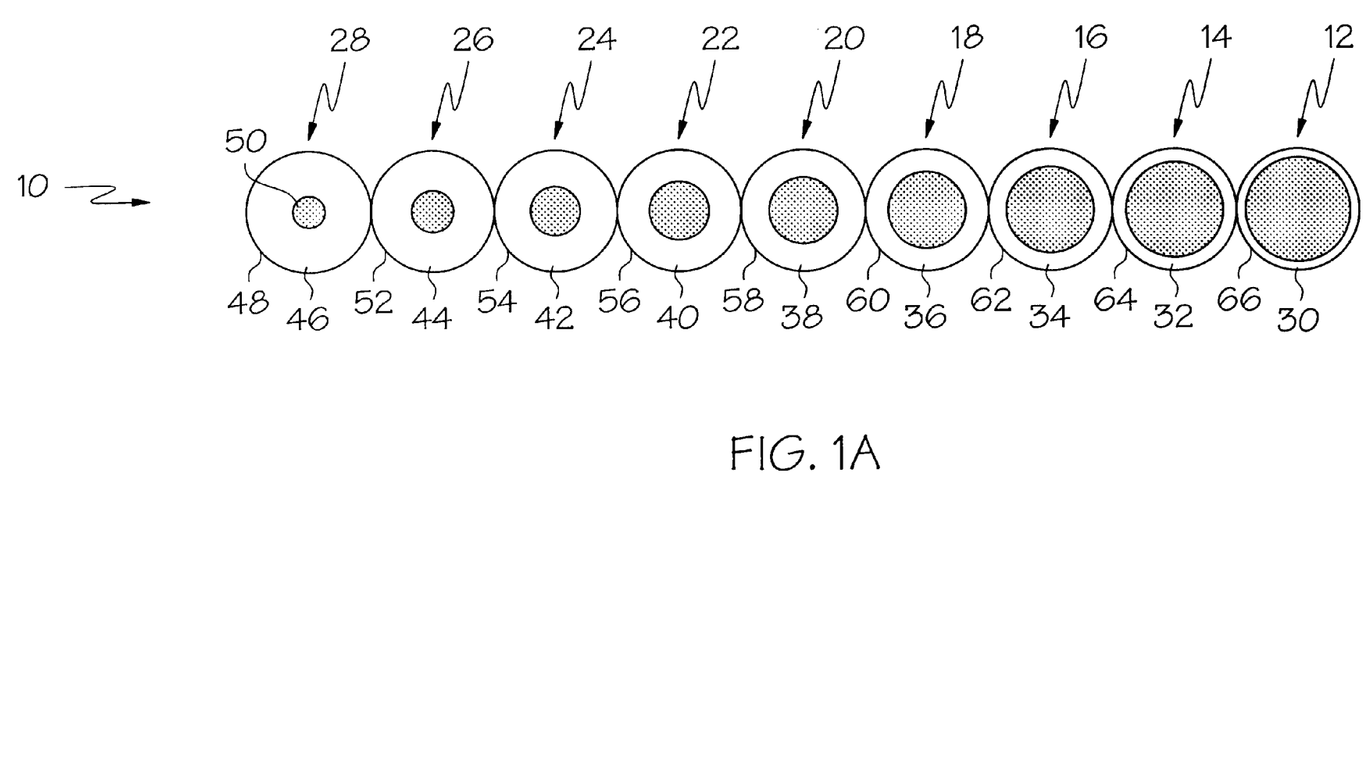
FIGS. 1A and 1B are enlarged views showing print quality indicators according to the present invention.

The present invention relates to a printed document and, more particularly, to a printed document that includes a print quality indicator on the print surface of the document. FIG. 1A illustrates a preferred graphical shape for the image of the print quality indicator 10 that is incorporated in the present invention. The print quality indicator 10 comprises a plurality of targets 12, 14, 16, 18, 20,22, 24, 26, and 28. Each of the targets 12–28 defines an unprinted area 30, 32, 34, 36, 38, 40,42, 44, and 46, respectively. As shown, the dimensions of the unprinted areas 30–46 of the targets 12–28 varying among the targets.

The method of determining the print quality of a printed document according to the present invention is based on an objective assessment of the degree of distortion of the print quality indicator 10 as it actually appears on the printed document. As will be discussed more fully below, the print quality of the printed document is determined by noting which of the unprinted areas 30–46 in the print quality indicator 10 printed on the document are not clearly free of ink upon close visual inspection of the document. An unprinted area of the shape illustrated in FIG. 1A is considered to be "clearly free of ink" when it is not bridged by ink at any point around its periphery.

Each of the targets 12–28 is of similar configuration, and target 28 will be discussed as exemplary in this regard. Target 28 includes a printed circle 48 having a specified outer diameter, a specified line weight, and a specified inner diameter. Target 28 further includes a printed circular dot 50 having a specified diameter positioned. Dot 50 is positioned centrally within the printed circle 48. The specified diameter of the printed circular dot 50 is less than the specified inner diameter of the printed circle 48. As a consequence, the unprinted area 46, defined between the printed circular dot 50 and the printed circle 48, is generally annular in shape.

The specified outer diameter of each of the printed circles 48, 52, 54, 56, 58, 60, 62, 64, and 66 is substantially the same, 0.010 inch. The specified inner diameter of each printed circle 48, 52, 54, 56, 58, 60, 62, 64, and 66 is substantially 0.006 inch. The dots within the nine targets 12–28 have substantially the following diameters: 0.0038 inch, 0.0035 inch, 0.0032 inch, 0.0028 inch, 0.0025 inch, 0.0022 inch, 0.0019 inch, 0.0016 inch, and 0.0013 inch, respectively.

The following chart will summarize the dimensions of the targets.

| Target No. | Circle O.D. | Circle Line Wt. | Dot. O.D. | Unprinted Area |
| --- | --- | --- | --- | --- |
| 1 | .010 in. | .002 in. | .0038 in. | .0011 in. |
| 2 | .010 in. | .002 in. | .0035 in. | .00125 in. |
| 3 | .010 in. | .002 in. | .0032 in. | .0014 in. |
| 4 | .010 in. | .002 in. | .0028 in. | .0016 in. |
| 5 | .010 in. | .002 in. | .0025 in. | .00175 in. |
| 6 | .010 in. | .002 in. | .0022 in. | .0019 in. |
| 7 | .010 in. | .002 in. | .0019 in. | .00205 in. |
| 8 | .010 in. | .002 in. | .0016 in. | .0022 in. |
| 9 | .010 in. | .002 in. | .0013 in. | .00235 in. |

As is no doubt apparent, the targets have been assigned numbers in order from right to left as seen in FIG. 1A.

As the quality of the print images in the primary printing areas on the print surfaces of documents configured according to the present invention declines, so does the quality of the images of the print quality indicators on those same print surfaces, also in the primary printing areas. This decline in print quality typically causes the annular unprinted areas to become somewhat blurred and indistinct, as a result of having ink printed in these areas. It has been found that the greater the deterioration of the print image, the larger must be the unprinted area of a target in order for the unprinted area to remain free of ink. As a result, the print quality of the printed document may be determined by noting which of the unprinted areas in the print quality indicator printed on the document are not clearly free of ink upon close visual inspection of the document. The higher the number of the target with the smallest unprinted area not having been obscured at least partly with ink, the lower the print image quality of the document. Thus, the identity of the target having the largest printed circular dot in which the unprinted area is free of ink on the printed document provides an objective indication of the sharpness or print quality of the print images printed on the print surface. The print targets are quite small, as pointed out above, so that they can be positioned in the primary printing area of a document without being noticed. As a consequence, it is necessary that the targets on the printed document be observed under magnification, preferably 30x magnification, to determine the identity of the target having the largest printed circular dot in which the unprinted area is free of ink.

Figure 1B:
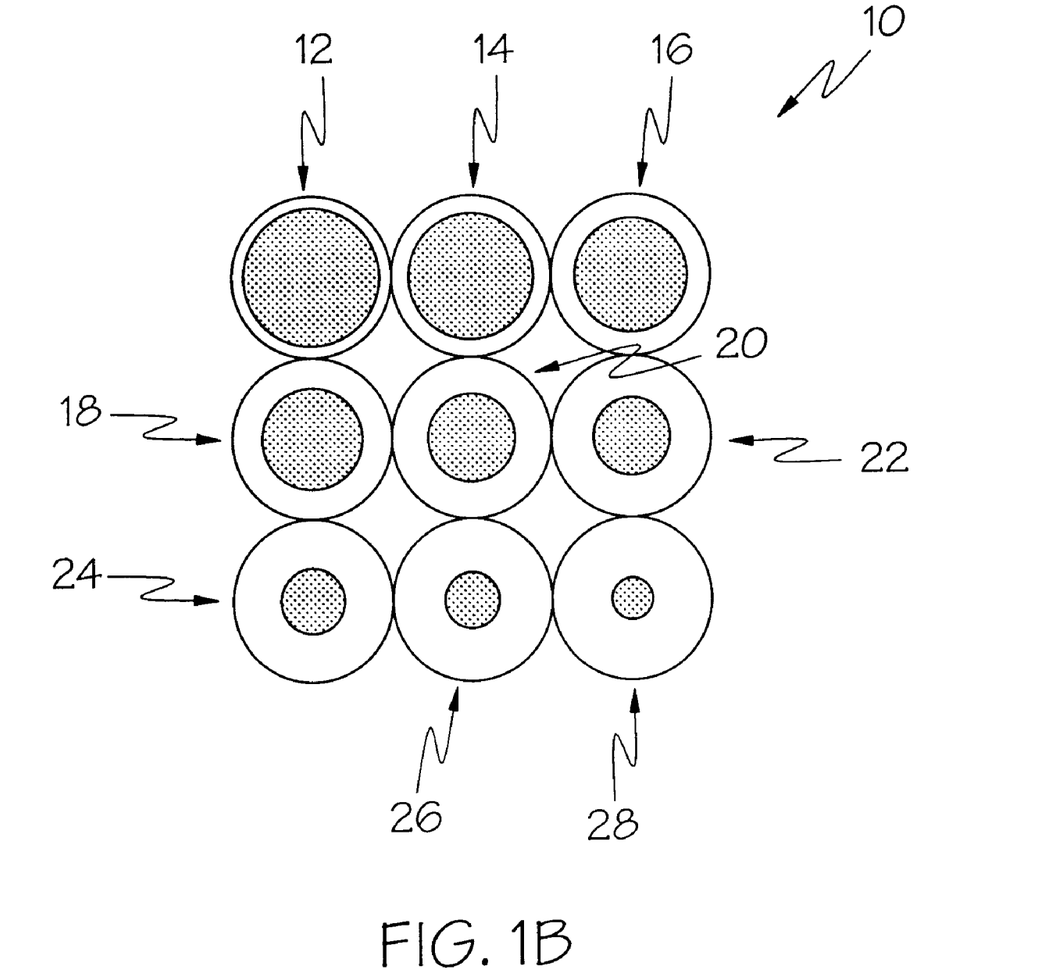

As seen in FIG. 1A, the targets 12–28 are arranged in a single row. Although the configuration of FIG. 1A is preferred, the targets 12–28 may instead be arranged in rows and columns, forming a generally rectangular array, as seen in FIG. 1B. In either instance, however, the targets are typically intermingled with the print images printed on the print surface of the document such that the distortion of the image of the targets making up the print quality indicator generally reflects the distortion of the print images on the document. By "intermingled" is meant that the targets appear in an area in the primary printing area which is free of halftone dots, but surrounded by such dots, making up the print image.

The nine targets making up the print quality indicator occupy a very small area on the print surface, approximately 0.010 inch by 0.090 inch for the print quality indicator of FIG. 1A and 0.030 inch by 0.030 inch for the print quality indicator of FIG. 1B. In either configuration, the print quality indicator targets are sufficiently small so as not to be readily apparent upon casual inspection of the print surface without the aid of magnification. The dots making up the targets are approximately the same size as half tone elements commonly used to print images on such documents. It may be, however, that the configuration of FIG. 1A is easier to hide within the print images of some documents than the configuration of FIG. 1B. Rather than being intermingled with the print images, the targets making up the print quality indicator may be positioned on the primary printing area, surrounded by print images, on those documents that have multiple print images.

The present invention contemplates the following method of determining the print quality of a printed document. The method is useful in assessing the sharpness of various types of documents, including for example checks and business forms. This is accomplished with the use of a print quality indicator image which is printed on the print surface of a document substrate. The document substrate may be any of the materials that are commonly used for printing documents, including various types of paper or other sheet materials.

The print quality indicator image includes a plurality of printed targets. Each of the targets defines an unprinted area, and the dimensions of the unprinted areas of the targets vary among the targets. Print images are printed on the print surface, along with the print quality indicator image. Because of the juxtaposition of the print images and the print quality indicator image on the primary printing area of the document, and the fact that the images are printed at the same time, a reduction in the sharpness of the print image on the print surface also results in a reduction in the sharpness of the print quality indicator. A slight reduction in the sharpness of the print quality indicator causes one or more of the smaller unprinted areas of the targets to be obscured by ink or at least not to be clearly free of ink. Progressively greater reduction in sharpness of the print image and the print quality indicator causes progressively larger unprinted areas of the targets to be obscured by ink or not clearly free of ink. The print quality of the document, therefore, is determined by visually inspecting the document, and noting which of the unprinted areas in the print quality indicator printed on the document are not clearly free of ink. The identity of the target having the largest printed circular dot in which the unprinted area is free of ink provides an objective indication of the sharpness or print quality of the print images printed on the print surface. To facilitate this process, and because the unprinted areas are so small, this visual inspection is preferably accomplished under magnification of approximately 30x. It will be appreciated that additional printing of print images may be accomplished on the document, either before or after printing of the print quality indicator. The print quality indicator will provide an indication of quality, however, only with respect to those print images that are printed along with the print quality indicator since those print images will presumably be of the same sharpness as the printed image of the print quality indicator.

The normal and inevitable variations that occur during printing cause the dots in the print quality indicator to increase in diameter to some degree, and also introduce a certain amount of distortion in the shapes of the dots and circles making up the targets. If these variations and distortions are sufficiently great, one or more of the dots on the document will contact their respective surrounding circles. When this occurs, the corresponding unprinted areas of those targets are no longer "clearly free of ink," as used herein. By examining the print quality indicator on several document samples that an expert has deemed to be of acceptable, albeit borderline, print quality, and identifying the highest number target number in those print quality indicators in which the dot contacts the associated circle, a minimum standard can be established. For example, if the target number 4 is determined to be the highest numbered target having a "touch" between the dot and the outer circle in those print quality indicators on documents of acceptable quality, then a standard might typically call for the target number 5 to be clearly free of ink (i.e., the circle and dot of target 20 will not touch at any point around the target, and the area 38 will not be bridged by ink).

It will be appreciated that numerous variations may be made in the print quality indicator arrangement of the present invention. Certainly, an indicator may be used having variously sized unprinted areas in shapes other than the annular shape shown in the drawings. The number of the unprinted areas may be increased or reduced from the nine such areas shown the in FIGS. 1A and 1B. The targets making up the unprinted areas can be arranged in a configuration other than a 1×9 or 3×3 array, such as for example in a diamond-shaped configuration. Alternatively, the targets can be distributed more widely over the document print surface rather than clustered together, although this may make visual inspection of the targets somewhat more difficult. Additionally, multiple print quality indicators may be printed at various locations on the print surface of the document, making the location of an indicator for inspection easier, and making any changes in print quality over the surface of the document detectable.

It will be further appreciated that the diameter of the circles, the line weight of the circles, the diameters of the dots, and the dimensions of the resulting unprinted areas may be varied depending upon the anticipated print quality levels to be measured, and the range of those print quality levels. For example, in the table, above, target number 1 defines the standard for plate making exposure and processing. The area 30 (FIG. 1) on the plate must be clear. Target number 5 may set the minimum quality standard for lithographic printing on bond type papers, on the other hand.

Figure 2:
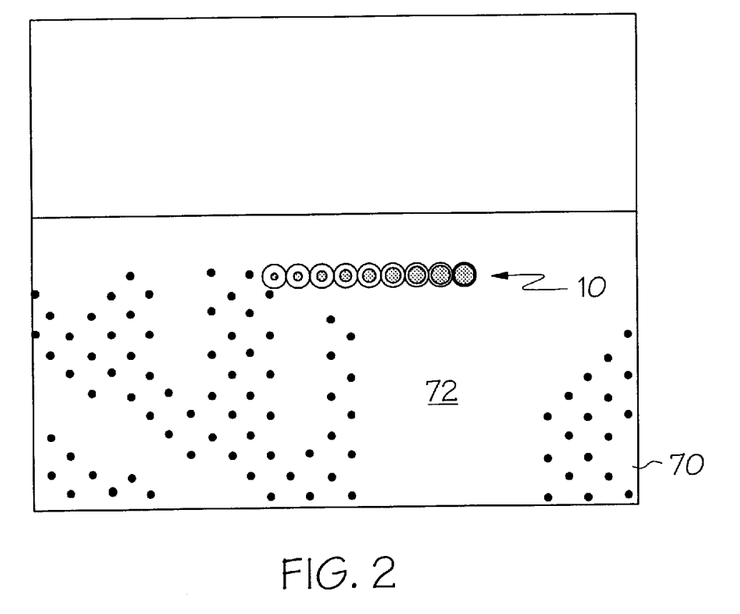
FIGS. 2–6 are enlarged views of portions of printed documents, showing print quality indicators according to the present invention and the manner in which such indicators provide an objective indication of print quality.
Figure 3:
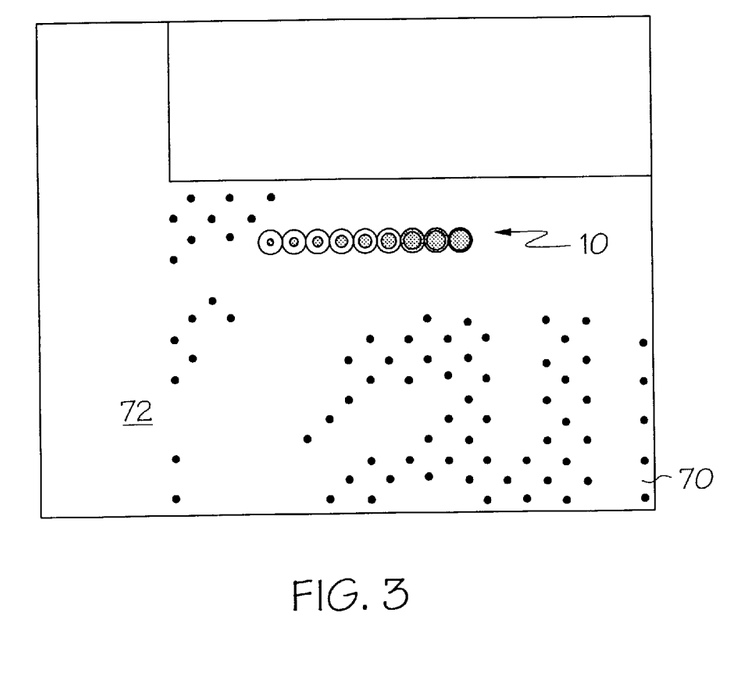
Figure 4:
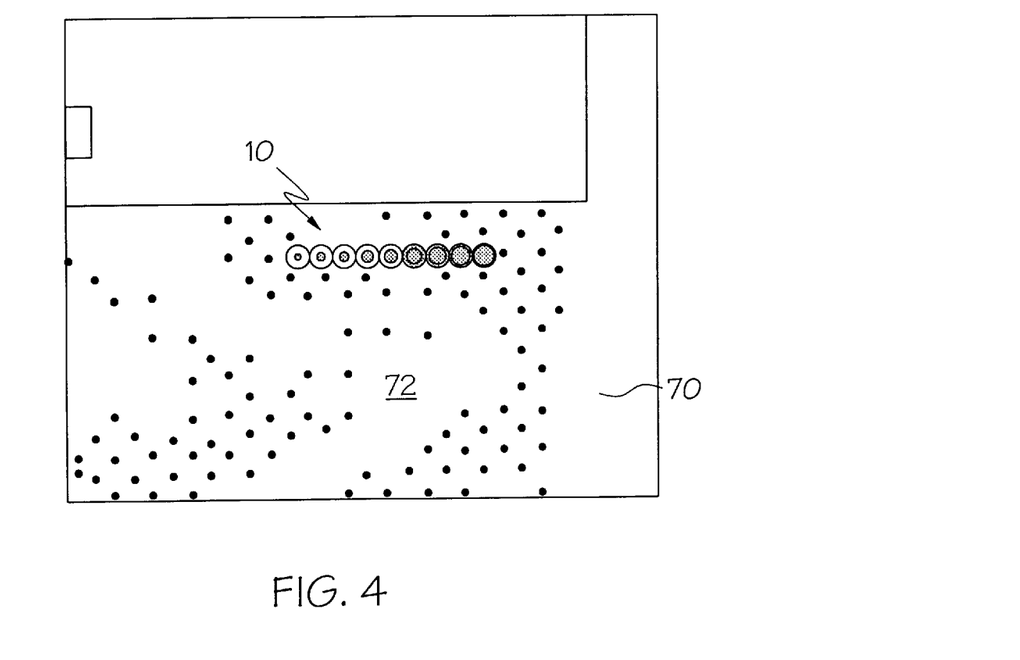
Figure 5:
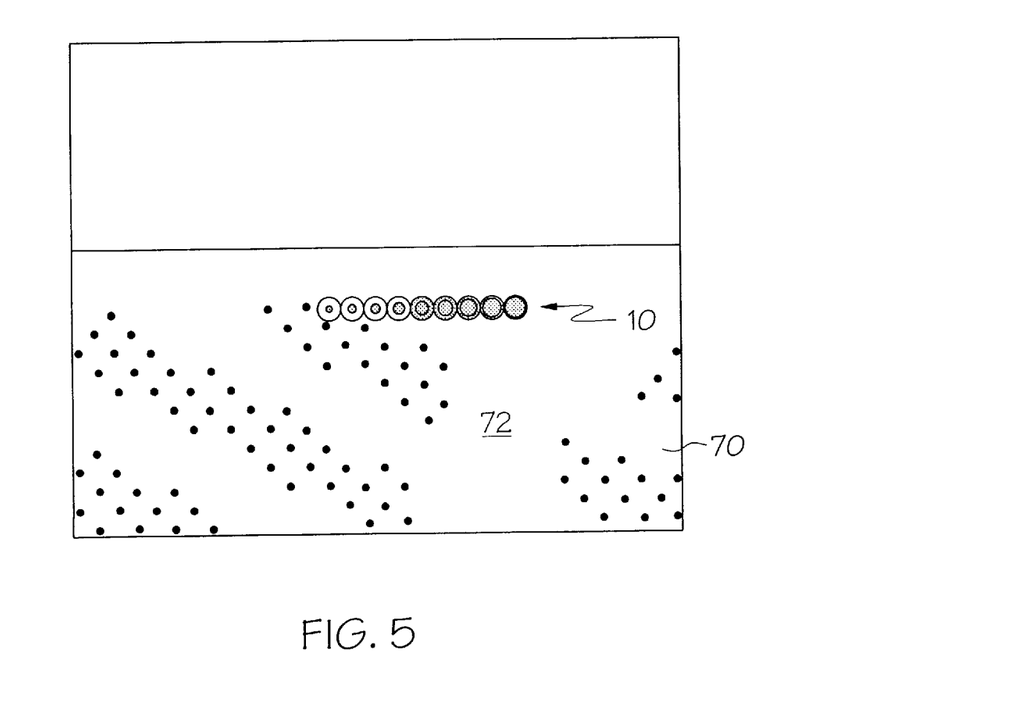
Figure 6:
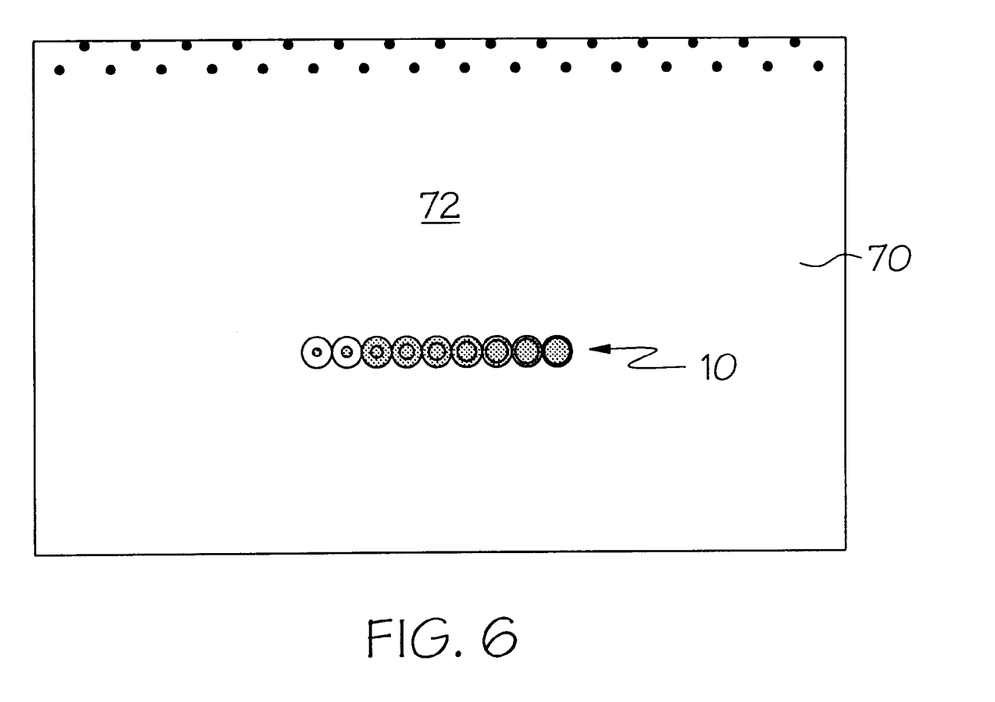

FIGS. 2–6 illustrate enlarged portions of various documents, showing the manner in which their respective print quality indicators 10 on the document substrates 70, defining print surfaces 72, function to provide an indication of print quality. In FIG. 2, the unprinted area of target number 3 (counting from right to left) is free of ink, providing an indication of excellent dot structure, i.e., size, shape, and edge distortion. FIG. 3 shows a clear unprinted area defined by target number 4, indicating very good dot structure. FIG. 4 illustrates a print quality indicator on a document in which the print quality meets only the minimum standard. In FIG. 4, target number 5 of the print quality indicator is free of ink, while the unprinted areas of targets numbers 1–4 are not. FIG. 5 illustrates a document which may be deemed to fail to meet quality standards. In the print quality indicator shown in FIG. 5, the target having the largest dot in which the unprinted area is clearly free of ink is target number 6. Target number 5 shows contact between the circle and the dot, indicating unacceptable print quality. Finally, the print quality indicator of FIG. 6 depicts a document having even worse print quality, with target number 8 being free of ink in the unprinted area. It will be appreciated that in making the assessment of quality, above, the choice of what is or is not acceptable is arbitrary, and may vary from one printing run to the next. Quality levels which are unacceptable for a given product or customer may be perfectly acceptable for a different product or another customer.

Having described the present invention in detail and by reference to various embodiments thereof, it will be apparent that certain modifications and variations are possible without departing from the scope of the invention defined in the appended claims.

What is claimed is:

1. A printed document including a print quality indicator on a print surface of the document in a primary printing area, comprising:
    a document substrate defining a print surface,
    print images printed on the print surface, and
    a print quality indicator printed on the print surface in the primary printing area, the image of the print quality indicator comprising a plurality of printed targets, each of the targets defining an unprinted area, dimensions of the unprinted areas of the targets varying among the targets, wherein the print quality of the printed document may be determined by noting which of the unprinted areas in the print quality indicator printed on the document are not clearly free of ink upon close visual inspection of the document.

2. A printed document according to claim 1 in which the print images and the image of the print quality indicator originate on a photographic negative and a desired image of each target comprises:
    a printed circle having a specified outer diameter, a specified line weight, and a specified inner diameter, and
    a printed circular dot having a specified diameter positioned centrally within the printed circle, the specified diameter of the printed circular dot being less than the specified inner diameter of the printed circle such that the printed circular dot and the printed circle define there between an unprinted area, the unprinted area being generally annular in shape.

3. A printed document according to claim 2 in which the specified outer diameter of each printed circle is substantially 0.010 inch, and in which the specified inner diameter of each printed circle is substantially 0.006 inch.

4. The printed document according to claim 3 in which the image of the print quality indicator comprises nine targets, the targets having printed circular dots of substantially the following diameters: 0.0038 inch, 0.0035 inch, 0.0032 inch, 0.0028 inch, 0.0025 inch, 0.0022 inch, 0.0019 inch, 0.0016 inch, and 0.0013 inch, whereby the identity of the target having the largest printed circular dot in which the unprinted area is free of ink on the printed document provides an objective indication of the sharpness or print quality of the print images printed on the print surface.

5. The printed document according to claim 4 in which the targets on the printed document are observed under substantially 30× magnification to determine the identity of the target having the largest printed circular dot in which the unprinted area is free of ink.

6. The printed document according to claim 1 in which the targets on the printed document are arranged in a single row and intermingled with the images printed on the print surface.

7. The printed document according to claim 1 in which the targets on the printed document are arranged in rows and columns forming a generally rectangular array and intermingled with the images printed on the print surface.

8. The printed document according to claim 1 in which the print quality indicator comprises nine targets, and in which the nine targets are arranged in a row, surrounded by the print images on the print surface.

9. The printed document according to claim 8 in which the nine targets occupy an area approximately 0.010 inch by 0.090 inch.

10. The printed document according to claim 1 in which the targets are sufficiently small so as not to be readily apparent upon casual inspection of the print surface without the aid of magnification.

11. A printed document including a print quality indicator on a print surface of the document in a primary printing area, comprising:
    a document substrate defining a print surface,
    print images printed on the print surface, and
    a print quality indicator printed on the print surface in the primary printing area, the image of the print quality indicator comprising a plurality of printed targets, the targets defining generally annular unprinted areas of varying dimensions, wherein the print quality of the printed document may be determined by noting which of the annular unprinted areas in the print quality indicator printed on the document are not clearly free of ink upon close visual inspection of the document.

12. The printed document of claim 11 in which the print images and the image of the print quality indicator originate on a photographic negative and the desired image of each target comprises a printed circle and a printed dot within the printed circle, the circle and dot defining the generally annular unprinted area there between.

13. The printed document of claim 12 in which the printed circles making up the printed targets are of substantially uniform size, and the printed dots making up the printed targets are of varying sizes.

14. The printed document of claim 11 in which the targets are printed in the same area on the print surface as the print images.

15. A method of determining the print quality of a printed document, comprising the steps of:

provic a print quality indicator image including a plurality of printed targets, each of the targets defining an unprinted area, dimensions of the unprinted areas of the targets varying among the targets, providing a document substrate defining a print surface, printing print images on the print surface in a primary printing area, and printing the print quality indicator image on the print surface in the primary printing area, and visually inspecting the document and noting which of the unprinted areas in the print quality indicator printed on the document are not clearly free of ink.

16. The method of claim 15 in which the step of providing a print quality indicator image includes the step of providing said print images and said print quality indicator image on a photographic negative, and in which said print quality indicator image includes a plurality of printed targets, each of the targets includes a printed circle having a specified outer diameter, a specified line weight, and a specified inner diameter, and a printed circular dot having a specified diameter positioned centrally within the printed circle, the specified diameter of the printed circular dot being less than the specified inner diameter of the printed circle such that the printed circular dot and the printed circle define there between an unprinted area, the unprinted area being generally annular in shape.

17. The method of claim 16 in which the specified outer diameter of each printed circle is substantially 0.010 inch, and in which the specified inner diameter of each printed circle is substantially 0.006 inch.

18. The method of claim 17 in which the image of the print quality indicator comprises nine targets, the targets having printed circular dots of substantially the following diameters: 0.0038 inch, 0.0035 inch, 0.0032 inch, 0.0028 inch, 0.0025 inch, 0.0022 inch, 0.0019 inch, 0.0016 inch and 0.0013 inch.

19. The method of claim 18 in which the identity of the target having the largest printed circular dot in which the unprinted area is free of ink on the printed document provides an objective indication of the sharpness or print quality of the print images printed on the print surface.

20. The method of claim 19 in which the step of visually inspecting the document and noting which of the unprinted areas in the print quality indicator printed on the document are not clearly free of ink includes the step of observing the targets on the printed document under substantially 30× magnification to determine the identity of the target having the largest printed circular dot in which the unprinted area is free of ink.

21. The method of claim 15 in which in which the targets on the printed document are arranged in a single row, intermingled with the images printed on the print surface.

22. The method of claim 15 in which the targets on the printed document are arranged in rows and columns forming a generally rectangular array and intermingled with the images printed on the print surface.

23. The method of claim 15 in which the print quality indicator image comprises nine targets, and in which the targets are arranged in a row, surrounded by the print images on the print surface.

24. The method of claim 23 in which the nine targets occupy an area approximately 0.010 inch by 0.090 inch.

25. The method of claim 15 in which the targets are sufficiently small so as not to be readily apparent upon casual inspection of the print surface without the aid of magnification.

26. The method of claim 15 in which the step of printing print images on the print surface, and printing the print quality indicator image on the print surface comprises the step of printing print images and the print quality indicator image on the print surface substantially simultaneously.

27. The method of claim 15 in which the step of printing print images on the print surface, and printing the print quality indicator image on the print surface comprises the step of printing at least some of the print images and the print quality indicator image on the print surface substantially simultaneously, while printing at least some print images on the print surface before printing the print quality indicator on the print surface.

28. The method of claim 15 in which the step of printing print images on the print surface, and printing the print quality indicator image on the print surface comprises the step of printing at least some of the print images and the print quality indicator image on the print surface substantially simultaneously, while printing at least some print images on the print surface after printing the print quality indicator on the print surface.

\* \* \* \* \*